United States Patent [19]

Matsumoto et al.

[11] Patent Number: 5,979,194
[45] Date of Patent: Nov. 9, 1999

[54] MOTOR SPEED CONTROL FOR WASHING MACHINE

[75] Inventors: Satoru Matsumoto; Hiroshi Ikeda; Yoshiyuki Makino; Fumihiro Imamura, all of Seto; Nobuichi Nishimura, Ichinomiya, all of Japan

[73] Assignee: Kabushiki Kaisha Toshiba, Kawasaki, Japan

[21] Appl. No.: 09/144,497

[22] Filed: Aug. 31, 1998

[30] Foreign Application Priority Data

Aug. 29, 1997 [JP] Japan .................................. 9-234953

[51] Int. Cl.$^6$ ...................................................... D06F 33/02
[52] U.S. Cl. ........................ 68/12.04; 68/12.02; 68/12.12; 68/12.14
[58] Field of Search ............................. 68/12.02, 12.04, 68/12.06, 12.12, 12.14

[56] References Cited

U.S. PATENT DOCUMENTS

| | | | |
|---|---|---|---|
| 4,513,464 | 4/1985 | Rettich et al. | 68/12.14 X |
| 4,782,544 | 11/1988 | Nystuen et al. | 68/12.14 X |
| 5,092,140 | 3/1992 | Matsuo et al. | 68/12.14 X |
| 5,704,136 | 1/1998 | Cho | 68/12.04 X |

FOREIGN PATENT DOCUMENTS

| | | |
|---|---|---|
| 314598 | 12/1989 | Japan . |
| 314599 | 12/1989 | Japan . |

*Primary Examiner*—Philip R. Coe
*Attorney, Agent, or Firm*—Pillsbury Madison & Sutro

[57] ABSTRACT

A full-automatic washing machine with an electric motor for driving an agitator and a dehydration tub includes an inverter main circuit including a plurality of switching elements connected to windings of a plurality of phases of the motor respectively, and a control device for driving the switching elements of the inverter main circuit. The control device executes an increase rate changing control in which a rotational speed of the motor is changed among a plurality of increase rates during drive of the motor in at least one of operation steps between a wash step and a final dehydration step before the motor reaches a final target speed.

19 Claims, 15 Drawing Sheets

| AMOUNT OF LAUNDRY | STEP | N1 | ΔN1 | N2 | ΔN2 | N3 | ΔN3 |
|---|---|---|---|---|---|---|---|
| HIGH | DEHYDRATION 1 | 200 rpm | 20 | 400 rpm | 10 | 890 rpm | 5 |
| HIGH | DEHYDRATION 2 | 300 rpm | 20 | 500 rpm | 10 | 890 rpm | 5 |
| HIGH | DEHYDRATION 3 | 400 rpm | 20 | 600 rpm | 10 | 890 rpm | 5 |
| MIDDLE | DEHYDRATION 1 | 250 rpm | 20 | 450 rpm | 10 | 890 rpm | 5 |
| MIDDLE | DEHYDRATION 2 | 350 rpm | 20 | 550 rpm | 10 | 890 rpm | 5 |
| MIDDLE | DEHYDRATION 3 | 450 rpm | 20 | 650 rpm | 10 | 890 rpm | 5 |
| LOW | DEHYDRATION 1 | 300 rpm | 25 | 500 rpm | 20 | 890 rpm | 10 |
| LOW | DEHYDRATION 2 | 400 rpm | 25 | 600 rpm | 20 | 890 rpm | 10 |
| LOW | DEHYDRATION 3 | 500 rpm | 25 | 700 rpm | 20 | 890 rpm | 10 |

FIG. 2

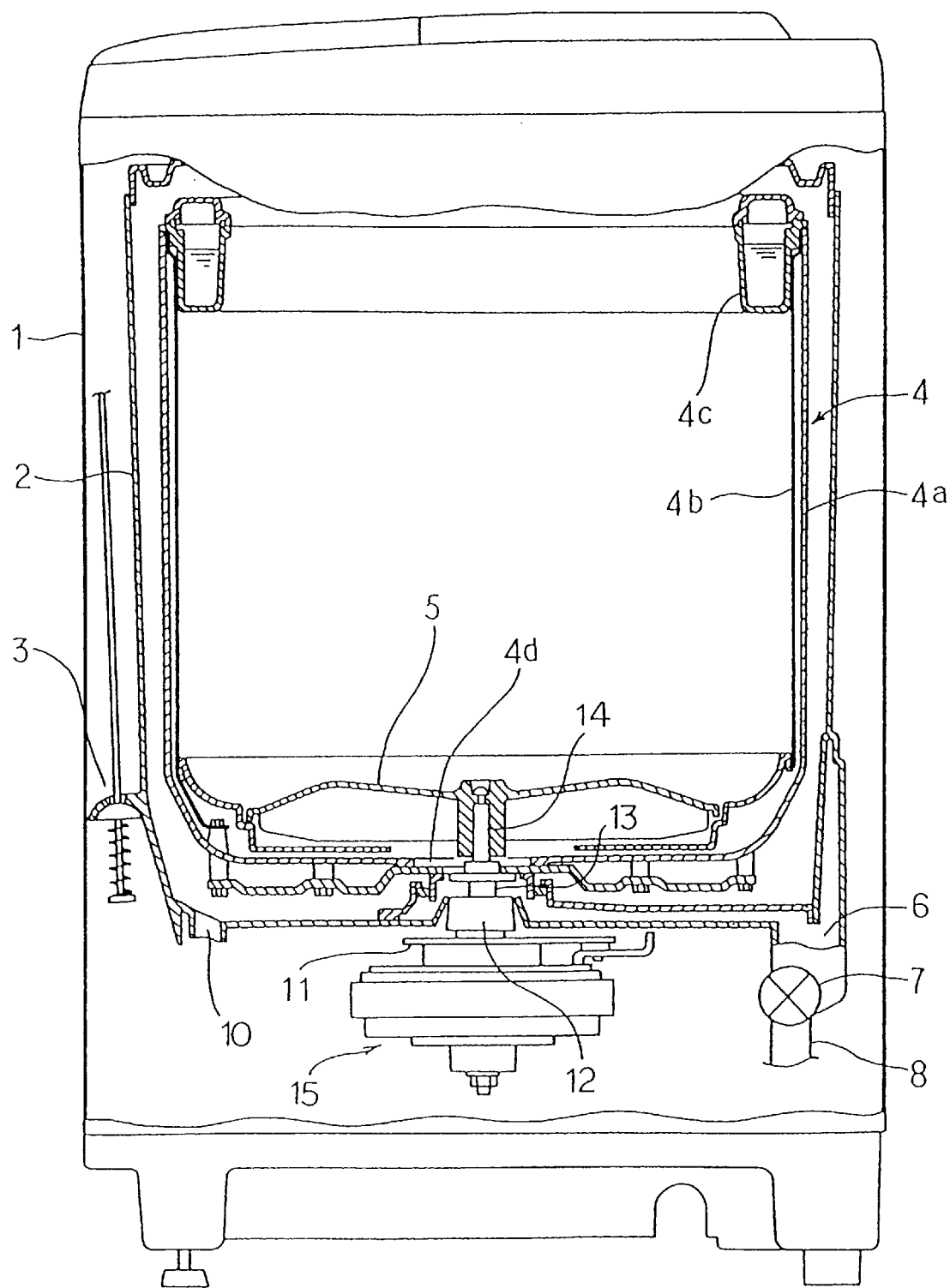
F I G. 5

| AMOUNT OF LAUNDRY | STEP | T1 | ΔN1 | T2 | ΔN2 | T3 | ΔN3 |
|---|---|---|---|---|---|---|---|
| HIGH | DEHYDRATION 1 | 40sec | 20 | 35sec | 10 | — | 5 |
| HIGH | DEHYDRATION 2 | 30sec | 20 | 30sec | 10 | — | 5 |
| HIGH | DEHYDRATION 3 | 20sec | 20 | 25sec | 10 | — | 5 |
| MIDDLE | DEHYDRATION 1 | 35sec | 20 | 30sec | 10 | — | 5 |
| MIDDLE | DEHYDRATION 2 | 25sec | 20 | 25sec | 10 | — | 5 |
| MIDDLE | DEHYDRATION 3 | 15sec | 20 | 20sec | 10 | — | 5 |
| LOW | DEHYDRATION 1 | 30sec | 25 | 25sec | 20 | — | 10 |
| LOW | DEHYDRATION 2 | 20sec | 25 | 20sec | 20 | — | 10 |
| LOW | DEHYDRATION 3 | 10sec | 25 | 15sec | 20 | — | 10 |

FIG. 7

| AMOUNT OF LAUNDRY | Tx | INCREASE RATE | Ty | INCREASE RATE |
|---|---|---|---|---|
| HIGH | ≥40sec | ΔN2 | ≥35sec | ΔN3 |
| HIGH | <40sec | ΔN2+5 | <35sec | ΔN3+5 |
| MIDDLE | ≥35sec | ΔN2 | ≥30sec | ΔN3 |
| MIDDLE | <35sec | ΔN2+5 | <30sec | ΔN3+5 |
| LOW | ≥30sec | ΔN2 | ≥25sec | ΔN3 |
| LOW | <30sec | ΔN2+5 | <25sec | ΔN3+5 |

FIG. 10

| AMOUNT OF LAUNDRY | STEP | T1 | ΔN1 | T3 | ΔN2 |
|---|---|---|---|---|---|
| HIGH | A≥80h | 40sec | 20 | 35sec | 10 |
| HIGH | A<80h | 40sec | 20 | 30sec | 10 |
| MIDDLE | A≥80h | 35sec | 20 | 30sec | 10 |
| MIDDLE | A<80h | 35sec | 20 | 25sec | 10 |
| LOW | A≥80h | 30sec | 25 | 25sec | 20 |
| LOW | A<80h | 30sec | 25 | 20sec | 20 |

FIG. 13

MOTOR SPEED CONTROL FOR WASHING MACHINE

BACKGROUND OF THE INVENTION

1. Field of the invention

This invention relates generally to a washing machine including an electric motor for driving a rotatable tub and an agitator, and more particularly to control of a speed increase rate of the motor in such a washing machine.

2. Description of the prior art

Conventional washing machines comprises a single-phase induction motor of the capacitor type for driving an agitator and a rotatable tub serving both as a wash tub and a dehydration tub. Voltage of a commercial AC power-supply is applied to the motor when the same is energized. Accordingly, a rotational speed of the motor is rapidly increased toward one according to a frequency of the commercial AC power-supply and the number of poles of the motor.

The rotatable tub swings to a large extent being rotated or vibrates to thereby produce noise in a dehydration operation when laundry is ununiformly distributed in the rotatable tub. To overcome this problem, the prior art has provided a washing machine in which the motor speed is switched in a plurality of stages by tap changing or phase control so that the motor speed is increased stepwise. In these control manners, however, the motor speed is increased still rapidly stepwise such that the motor produces electromagnetic noise or the rotatable tub vibrates. Consequently, a desired noise reduction cannot be achieved.

SUMMARY OF THE INVENTION

Therefore, an object of the present invention is to provide a washing machine wherein a rapid increase in the motor speed can be prevented and a desired noise reduction can be achieved.

The present invention provides a washing machine including an electric motor for driving an agitator and a dehydration tub, comprising an inverter main circuit including a plurality of switching elements connected to windings of a plurality of phases of the motor respectively, and control means for driving the switching elements of the inverter main circuit, the control means including means for executing an increase rate changing control in which a rotational speed of the motor is changed among a plurality of increase rates during drive of the motor in at least one of operation steps between a wash step and a final dehydration step before the motor reaches a final target speed.

According to the above-described control device, the motor speed is gradually increased through a plurality of originally set different increase rates. Consequently, since the motor speed is not increased stepwise or rapidly, the noise reduction can be improved. The noise tends to be produced more in the dehydration step than when the motor is rotated in the normal and reverse directions alternately to rotate the agitator in these directions in the wash and rinse steps. Accordingly, the increase rate changing control is preferred to be executed at the time of start of the dehydration step.

In a preferred form, a time when the increase rate of the motor speed is changed by the increase rate changing control corresponds to a time when the motor reaches at least one target speed provided in the midst of a speed range leading to the final target speed. Consequently, an optimum increase rate can be set according to a speed range of the motor.

In another preferred form, the control means further includes laundry amount detecting means for detecting an amount of laundry. In this arrangement, the increase rate changing time is changed according to a result of detection by the laundry amount detecting means in the increase rate changing control. When the increase rate is set according to the amount of laundry at the time of execution of the dehydration operation, the rotatable tub can get over the rotational speeds at which the tub tends to produce noise.

In further another preferred form, either the increase rate changing time or the increase rate to be changed differs between at least one of a dehydration operation of the wash step, a dehydration operation of a rinse step, and the final dehydration operation and the other dehydration operations.

In further another preferred form, the washing machine further comprises timing means for timing reach of an intermediate target rotational speed of the motor and wherein the subsequent increase rate of the motor speed is changed according to a time obtained by the timing means.

In further another preferred form, the washing machine further comprises rotational nonuniformity detecting means for detecting rotational nonuniformity of the motor and wherein the increase rate changing time is changed according to a result of detection by the rotational nonuniformity detecting means.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 2 shows target rotational speeds of the motor set by the microcomputer;

FIG. 5 is a longitudinal section of the washing machine;

FIG. 7 shows predetermined times starting with energization of the motor and the increase rates during the times;

FIG. 10 shows the reference times and the increase rates;

FIG. 13 shows predetermined times starting with energization of the motor and the increase rates during the times in a fifth embodiment in accordance with the present invention.

DETAILED DESCRIPTION OF THE PREFERRED EMBODIMENTS

Figure 1:
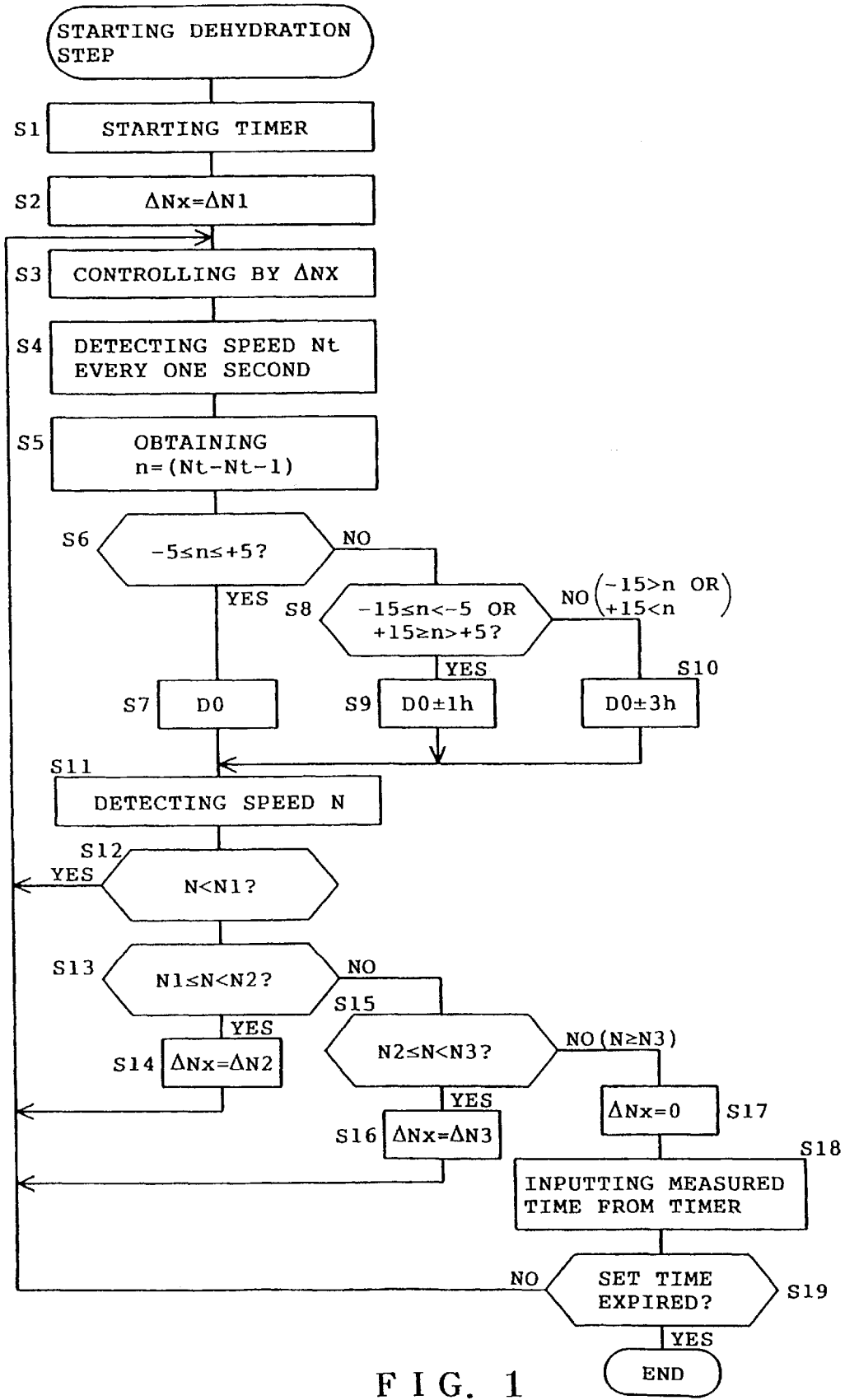
FIG. 1 is a flowchart showing the control contents in the dehydration step executed by the control device of a first embodiment in accordance with the present invention.

A first embodiment of the present invention will be described with reference to FIGS. 1 to 5. The invention is applied to a full-automatic washing machine in the embodiment. Referring first to FIG. 5, the overall construction of the full-automatic washing machine is shown. The washing machine comprises an outer cabinet 1 enclosing an outer or water-receiving tub 2 receiving water discharged in a dehydration operation. The waterreceiving tub 2 is suspended on a plurality of elastic suspension mechanisms 3 one of which is shown. A rotatable tub 4 serving both as a wash tub and as a dehydration basket is rotatably mounted in the water-receiving tub 2. An agitator 5 is rotatably mounted on the bottom of the rotatable tub 4.

The rotatable tub 4 includes a generally cylindrical tub body 4a, an inner cylinder 4b provided inside the tub body 4a to define a water passing space, and a balancing ring 4c mounted on an upper end of the tub body 4a. Upon rotation of the rotatable tub 4, a resultant centrifugal force raises water therein, which is then discharged into the water-receiving tub 2 through dehydration holes (not shown) formed in the upper portion of the tub body 4a.

A drain hole 6 is formed in the right-hand bottom of the water-receiving tub 2, as viewed in FIG. 5. A drain valve 7 is provided in the drain hole 6. A drain hose 8 is connected to the drain hole 6. The drain valve 7 is a motor operated valve closed and opened by a drain valve motor 9 (see FIG. 3B) serving as drain valve driving means. The drain valve motor 9 comprises a geared motor, for example. An auxiliary drain hole 10 is formed in the left-hand bottom of the water-receiving tub 2, as viewed in FIG. 5. The auxiliary drain hole 10 is connected through a connecting hose (not shown) to the drain hose 8. The auxiliary drain hole 10 is provided for discharging water which has been discharged through the dehydration holes in the upper portion of the rotatable tub 4 into the water-receiving tub 2 upon rotation of the rotatable tub 4 for the dehydration operation.

Referring further to FIG. 5, a mechanism base 11 is mounted on an outer bottom of the water-receiving tub 2. The mechanism base 11 is formed in its central portion with a vertically extending shaft support cylinder 12. A hollow tub shaft 13 is inserted in the shaft support cylinder 12 to be supported for rotation. An agitator shaft 14 is inserted in the tub shaft 13 to be supported for rotation. The agitator shaft 14 has an upper end connected to the agitator 5.

An outer rotor type brushless motor 15 serving as a washing machine motor, for example, is mounted on the mechanism base 11. A lower end of the agitator shaft 14 extending downward out of the tub shaft 13 is connected to a rotor (not shown) of the motor 15. Accordingly, the agitator 5 is rotated together with the rotor upon start of the motor 15.

A clutch (not shown) is provided on the lower end of the tub shaft 13 for engagement and disengagement between the tub shaft 13 and the rotor of the motor 15. The clutch has a function of switching between a first mode in which the tub shaft 13 is operatively coupled to the rotor of the motor 15 in the dehydration operation so that the rotatable tub 4 is rotated together with the agitator 5 and a second mode in which the tub shaft 13 is decoupled from the rotor in the wash operation so that only the agitator 5 is rotated.

Figure 4A:
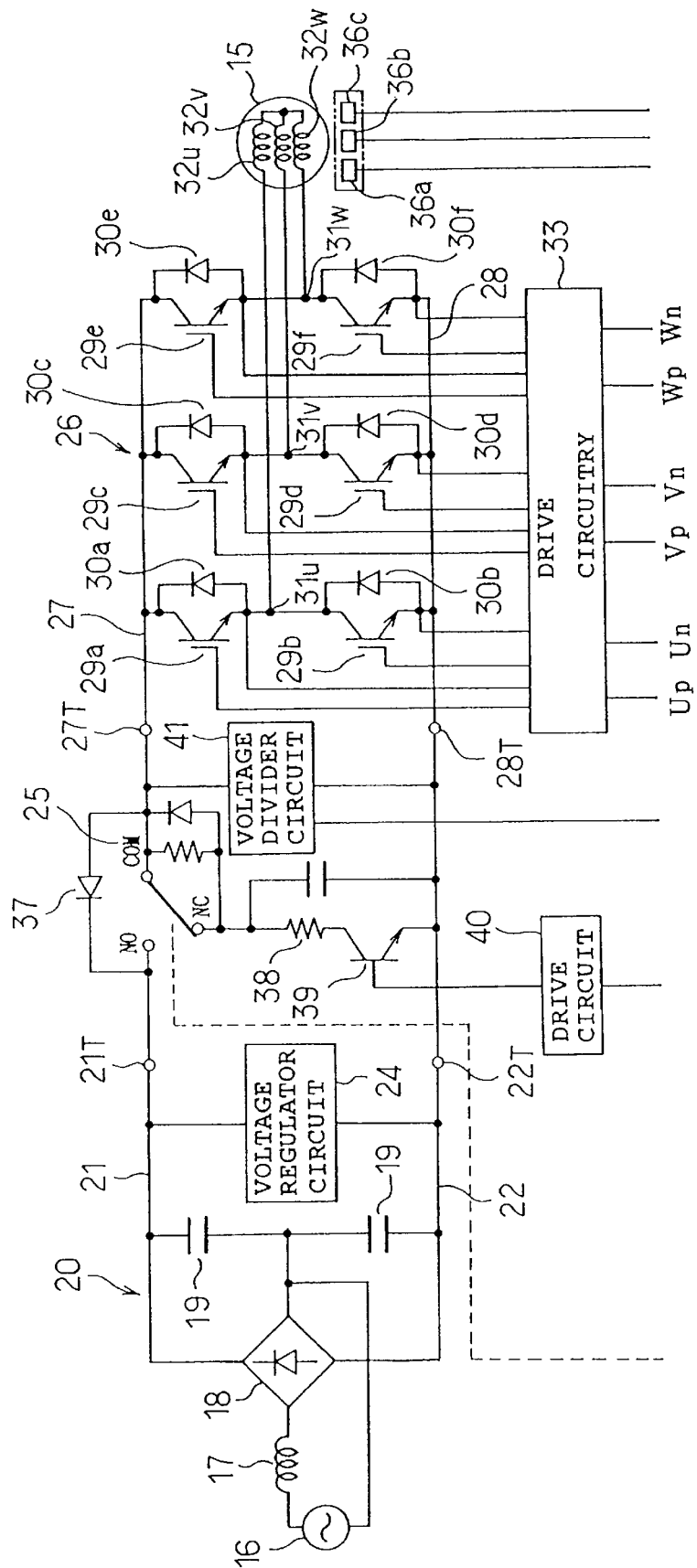
FIGS. 4A and 4B are circuit diagrams showing the electrical arrangement of the washing machine.
Figure 4B:
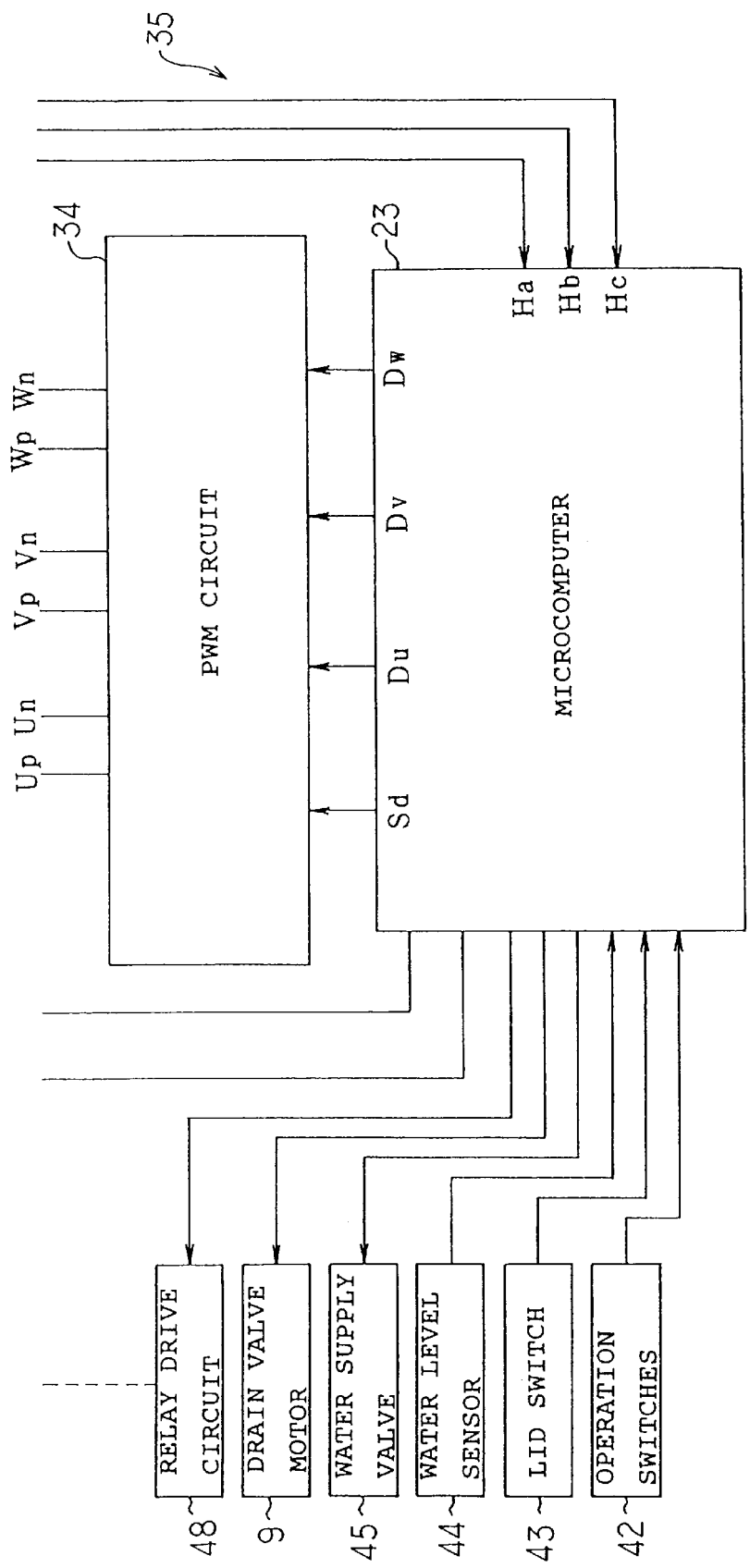

An electrical arrangement of the washing machine will now be described with reference to FIGS. 4A and 4B. Both terminals of an AC power supply 16 are connected to input terminals of a full-wave rectifier circuit 18 with a reactor 17 being connected to one of the terminals. Smoothing capacitors 19a and 19b are connected between output terminals of the full-wave rectifier circuit 18. The smoothing capacitors 19a and 19b and the full-wave rectifier circuit 18 constitute a DC power supply circuit 20. A voltage regulator circuit 24 is connected between positive and negative side power supply lines 21 and 22 serving as output lines of the DC power supply circuit 20. The voltage regulator circuit 24 supplies a constant DC voltage to a microcomputer 23 serving as a control section etc. An output terminal 21T of the positive side power supply line 21 is connected via a normally open (NO) terminal and a common (COM) terminal of a relay switch 25 serving as switching means to an input terminal 27T of a positive side DC power supply line 27 of an inverter main circuit 26. The other output terminal 22T is connected to an input terminal 28T of a negative side DC power supply line 28 of the inverter main circuit 26.

The inverter main circuit 26 is composed of three-phase bridge-connected switching elements 29a to 29f comprising respective IGBTs and free-wheel diodes 30a to 30f connected in parallel to the respective switching elements 29a to 29f. The inverter main circuit 26 has output terminals 31u, 31v and 31w connected to windings 32u, 32v and 32w of the motor 20 respectively. The switching elements 29a to 29f include control terminals or gates connected to drive circuitry 33 comprising, for example, photocouplers. The drive circuitry 33 is controlled by signals delivered from a pulse width modulation (PWM) circuit 34 to thereby on-off control the switching elements 29a to 29f. The PWM circuit 34 is provided with means for generating a triangular wave signal having a predetermined frequency. Based on energization signals Du, Dv and Dw supplied from the microcomputer 23, the PWM circuit 34 forms pulse-width modulated drive signals Up, Un, Vp, Vn, Wp and Wn so that sinusoidal winding currents flow through three-phase windings 32u, 32v and 32w of the motor 15, which drive signals are delivered to the drive circuitry 33. The DC power supply circuit 20, the inverter main circuit 26, the drive circuitry 33 and the PWM circuit 34 constitute control means 35.

The brushless motor 15 is provided with three Hall ICs 36a, 36b and 36c serving as position detecting means for detecting magnetic pole locations of permanent magnets of the rotor thereof to thereby detect the position of the rotor. Position signals Ha, Hb and Hc generated by the respective Hall ICs 36a to 36c are delivered to the microcomputer 23.

Based on the position signals Ha, Hb and Hc, the microcomputer 23 delivers the energization signals Du, Dv and Dw to the PWM circuit 34. Based on the energization signals Du, Dv and Dw, the PWM circuit 34 delivers the drive signals Up, Un, Vp, Vn, Wp and Wn to control the switching elements 29a to 29f of the inverter main circuit 26. Consequently, the motor 15 is energized so that the windings thereof 32u, 32v and 32w have a phase difference of 120 degrees (electrical angle) form one another. The drive signals Up and Un are used to on-off control the switching elements 29a and 29b each connected to the phase U winding 32u. The drive signals Vp and Vn are used to on-off control the switching elements 29c and 29d each connected to the phase V winding 32v. The drive signals Wp and Wn are used to on-off control the switching elements 29e and 29f each connected to the phase W winding 32w.

The microcomputer 23 further detects a rotational speed of the motor 15 on the basis of an input timing of any one of the position signals Ha, Hb and Hc. The microcomputer 23 then delivers to the PWM circuit 35 a duty signal Sd according to the deviation between the detected speed and a command speed. The PWM circuit 35 on-off controls the switching elements 29a to 29f by means of an ON duty ratio according to the duty signal Sd, so that the speed of the motor 15 is controlled by the PWM control.

The motor 15 is rotated repeatedly alternately in the normal and reverse directions for a predetermined time including a preselected stop time in the wash operation and is rotated in one direction to rotate the rotatable tub 4 for a set time in the dehydration operation. The motor 15 is controlled so that its rotational speed is increased at a predetermined increase rate in normal and reverse rotations in the wash operation and the rotation thereof in the dehydration operation. For this control of speed increase, the microcomputer 23 controls output amplitudes of the drive signals Up, Un, Vp, Vn, Wp and Wn which are modulated waves, so that effective values of the inverter output voltages differ at each of speed increase rates ΔN1, ΔN2 and ΔN3 which will be described later.

The relay switch 25 has a normally closed (NC) terminal as well as the NO and COM terminals. The relay switch 25 is driven by a relay drive circuit (not shown) controlled by the microcomputer 23. The relay drive circuit energizes a relay coil (not shown) of the relay switch 25 at the time of start of the washing operation to thereby close a circuit between the NO and COM terminals, whereby the inverter main circuit 26 is connected to the DC power supply circuit 20. The relay drive circuit deenergizes the relay coil at the time of finish of the dehydration operation executed in the midst of the washing operation and at the time of finish of the washing operation with the end of a final dehydration operation. As a result, the circuit between the NO and COM terminals of the relay switch 25 is opened and a circuit between the COM and NC terminals is closed.

A regenerative diode 37 is connected between the NO and COM terminals of the relay switch 25. When the circuit between the NO and COM terminals is closed, the windings 32u, 32v and 32w of the brushless motor 15 are connected via the regenerative diode 37 to the DC power supply circuit 20. Accordingly, the brushless motor 15 operates as a generator to produce a braking force. In this case, the currents induced in the respective windings 32u, 32v and 32w flow through the regenerative diode 37 to the side of the DC power supply circuit 20.

A discharge resistance 38 and a discharge switching element 39 are series connected between the NC terminal of the relay switch 25 and the negative side power supply line 28 of the inverter main circuit 26. The discharge switching element 39 is controlled via a drive circuit 40 comprising a photocoupler by the microcomputer 23. A voltage divider circuit 41 detects voltage between the positive and negative side power supply lines 27 and 28. The microcomputer 23 turns on the discharge switching element 39 when a detected voltage is at or above a predetermined value. Then, the currents induced in the respective windings 32u, 32v and 32w flow through the discharge resistance 38 to be converted into heat energy, whereby the brushless motor 15 is braked.

The microcomputer 23 receives signals from various operation switches 42, a lid switch 43, a water-level sensor 44, etc. Based on these input signals and a previously stored program, the microcomputer 23 controls a water supply valve 45, the drain valve motor 9, etc.

In the embodiment, the washing operation includes a wash step including water supply, the washing operation and draining, an intermediate dehydration step in which the rotatable tub 4 is rotated so that wash liquid is removed from the laundry, a showering rinse step in which the laundry is rinsed under rotation of the tub 4 with water being poured onto the laundry, a rinse and dehydration step, a stored-water rinse step including water-supply, a rinsing operation and draining, and a final dehydration step in which the tub 4 is rotated so that wash liquid is removed from the laundry, in this sequence.

Figure 3:
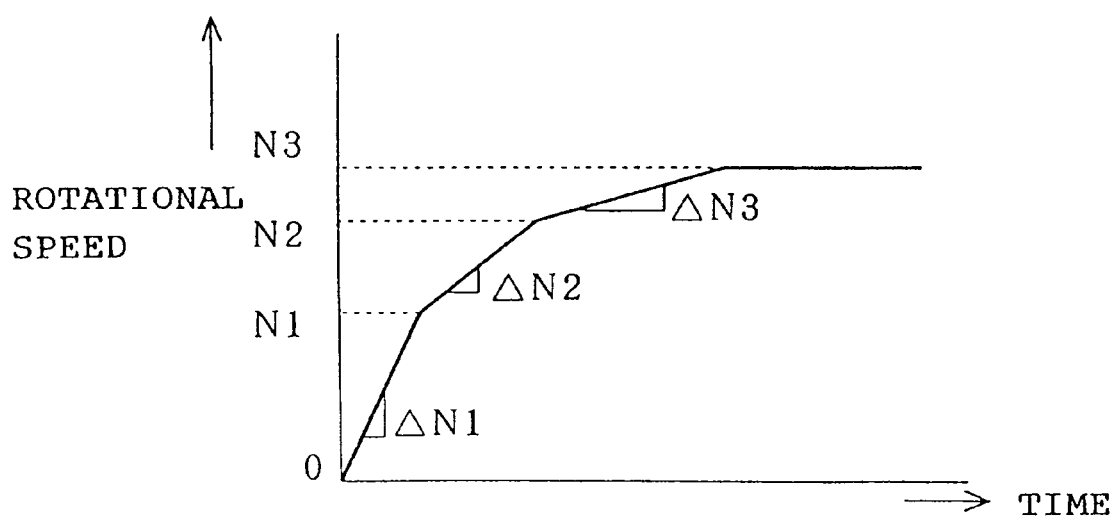
FIG. 3 is a graph showing speed increase characteristics of the motor in the dehydration step.

Upon start of the washing operation, an amount of laundry is detected before water supply in the wash step. In laundry amount detection, laundry is accommodated in the rotatable tub 4 and the agitator 5 is rotated without water supply. Since the rotational speed of the agitator 5 or the brushless motor 15 is low when an amount of laundry is large, the microcomputer 23 detects the amount of laundry (amount of load) based on the speed of the brushless motor 15. Based on the information obtained by the detection of laundry amount, the microcomputer 23 sets a water level in the rotatable tub 4 (water-receiving tub 2) for the washing operation among HIGH, MIDDLE and LOW and further sets executions times of the respective steps. Furthermore, a plurality of target speeds including a final one are set with respect to the speed control of the motor 15 in each dehydration step. The microcomputer 23 sets these target speeds according to the information obtained from the laundry amount detection as shown in FIGS. 2 and 3. In FIG. 2, HIGH, MIDDLE and LOW in the column of laundry amount designate water levels according to the amount of laundry. DEHYDRATION 1 in the column of step designates the intermediate dehydration step subsequent to the wash step. DEHYDRATION 2 designates the rinse and dehydration step subsequent to the showering rinse step. DEHYDRATION 3 designates the final dehydration subsequent to the stored-water rinse step.

In the embodiment, three-stage target speeds N1 to N3 including the final target speed are set for DEHYDRATION steps 1 to 3 as shown in FIG. 3. Furthermore, increase rates of speed of the motor 15 in periods for which the motor reaches the target speeds are switched to different values, respectively.

In FIG. 3, reference symbol ΔN1 designates a speed increase rate until reach to the target speed N1 in DEHHYDRATIONS 1 to 3. Reference symbol ΔN2 designates a speed increase rate between the target speeds N1 and N2. Reference symbol ΔN3 designates a speed increase rate between the target speeds N2 and N3. In the embodiment, each of the speed increase rates ΔN1, ΔN2 and ΔN3 is shown by a number of revolution increased per second, and the relationship among the increase rates is shown as ΔN1>ΔN2>ΔN3.

The control of the rotational speed of the motor 15 in DEHYDRATIONS 1 to 3 will now be described with reference to FIG. 1. When advancing to the dehydration step, the microcomputer 23 starts a timing operation of a timer serving as timing means at step S1 and sets the speed increase rate ΔNx at ΔN1 at step S2. At step S3, the microcomputer 23 sets an ON duty of the switching elements 29a to 29f at a predetermined value D0 so that effective values of voltages applied to the windings 32u to 32w brings about the speed increase rate ΔN1. The microcomputer 23 starts energization to the motor 15 based on the set conditions.

Thereafter, the microcomputer 23 advances to step S4 to detect the speed Nt of the motor 15 at intervals of one second. At step S5, the microcomputer 23 obtains the difference n=(Nt−Nt−1) between the currently detected speed Nt and the previously detected speed Nt−1. The microcomputer 23 then advances to step S6 to determine whether −5 rpm≦n≦+5 rpm. When the difference n is within the range, the microcomputer 23 determines in the affirmative (YES at step S6), advancing to step S7 to maintain the duty D at the value D0 set at step S3. When determining in the negative at step S6, the microcomputer 23 advances to step S8 to determine whether −15 rpm≦n>−5 rpm or +5 rpm>n≦+15 rpm. When the difference n is within either range, the microcomputer 23 determines in the affirmative (YES at step S8), advancing to step S9 to change the duty DO set at step S8 within a range of ±1h. When determining in the negative at step S8, the microcomputer 23 advances to step S10 to change the duty DO within a range of ±3h. "±1h" or "±3h" represents a degree of increase or decrease of the duty.

After changing the duty DO according to the difference n, the microcomputer 23 detects the speed of the motor 15 at step S11 and then advances to step S12 to determine whether the detected speed N is below N1. When the detected speed N is below N1, the microcomputer 23 determines in the affirmative at step S12, returning to step S3. Thereafter, the microcomputer 23 repeats steps 3 to 12. When the speed of the motor 15 is at or above N1, the microcomputer 23 determines in the negative, advancing to step S13 to determine whether the speed N is at or above N1 and below N2. When the speed N is below N2, the microcomputer 23 determines in the affirmative (YES at step S13) and advances to step S14 to change the speed increase rate ΔNx from ΔN1 to ΔN2, returning to step S3. Thereafter, the microcomputer 23 repeats steps S3 to S14.

When the speed N of the motor 15 reaches N2, the microcomputer 23 determines in the negative (NO at step S13), advancing to step S15 to determine whether the speed N is at or above N2 and below N3. When N is below N3, the microcomputer 23 determines in the affirmative (YES at step S15), advancing to step S16 to change the increase rate ΔNx from ΔN2 to ΔN3. The microcomputer 23 then returns to step S3 to repeat steps S3 to S16.

When the detected speed is at or above N3, the microcomputer 23 determines in the negative (NO at step S15) and advances to step S17 to set the speed increase rate ΔNx at 0 so that N3 is maintained. The microcomputer 23 then advances to step S18 to input measured time from the timer and further to step S19 to determine whether the measured time has reached the set time of the dehydration step, thereafter returning to step S3. When the counter counts the set time, the microcomputer 23 determines in the affirmative (YES at step S19), stopping the motor 15 to thereby finish the dehydration step.

According to the foregoing embodiment, the rotational speed of the motor 15 is increased with the speed increase rate ΔNx being set at the predetermined value from the start of energization to the motor. Consequently, since the motor speed is prevented from rapidly increasing, motor noise can be reduced. Furthermore, the increase rate is changed from ΔN1 to ΔN2 and from ΔN2 to ΔN3. Consequently, an optimum speed increase rate can be set according to the load. For example, laundry contains a large amount of water at the initial stage of the dehydration. In this case, ΔN1 is rendered large so that an amount of water to be removed from the laundry is increased. When the motor speed reaches N1, the speed increase rate is lowered to ΔN2 so that the motor speed can get over a resonance speed range of the rotatable tub 4, being harmonized with the amount of water to be removed from the laundry. Thereafter, the increase rate is further reduced to ΔN3 when the motor speed reaches N2. Thus, the motor speed can smoothly be maintained at N3 since the rotational speed of the tub 4 does not excessively exceed N3.

The microcomputer 23 detects the rotational speed of the motor 15 at predetermined intervals, for example, at intervals of one second to obtain the speed increase rate. The microcomputer 23 changes the ON duty of PWM according to the obtained speed increase rate. This control manner reduces variations in time the rotational speed of the tub 4 requires to increase to ΔN3. Consequently, a high dehydrating performance can be achieved within the set time of dehydration step. Furthermore, as shown in FIG. 2, the values of ΔN1 to ΔN3 are changed according to the amount of laundry. This can reduce the variations in time the speed of the tub 4 requires to increase to ΔN3 can be reduced even when the amount of laundry accommodated in the tub 4 varies.

Furthermore, the first and second target speeds N1 and N2 are changed in DEHYDRATIONs 1 to 3 in the foregoing embodiment. Consequently, the dehydration operation can be executed in the mode according to the intermediate dehydration, the showering rinse and dehydration or the final dehydration. The speed increase rates ΔN1, ΔN2 and ΔN3 may be changed in DEHYDRATIONs 1 to 3.

Figure 6:
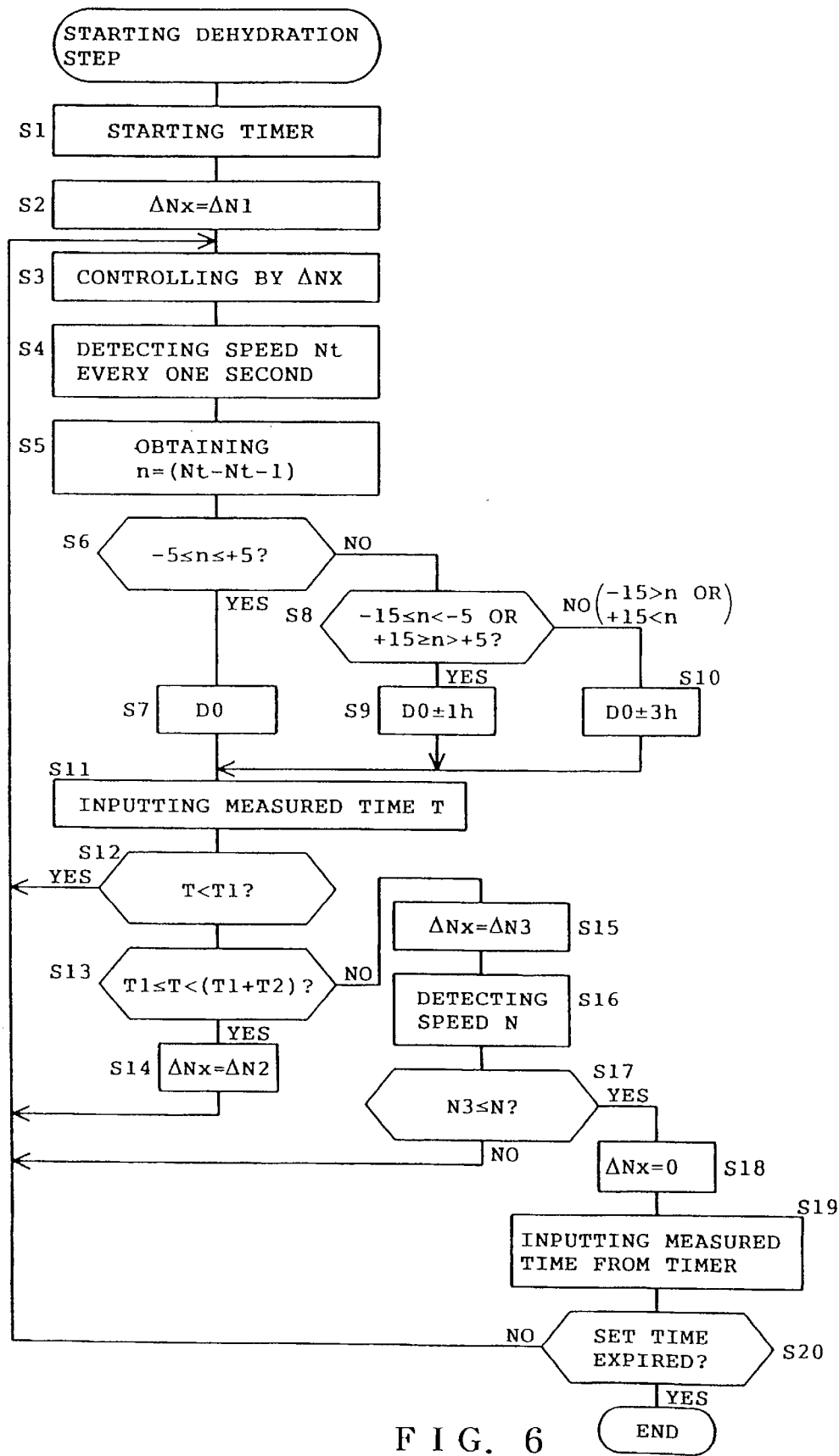
FIG. 6 is a flowchart similar to FIG. 1, showing a second embodiment of the invention.
Figure 8:
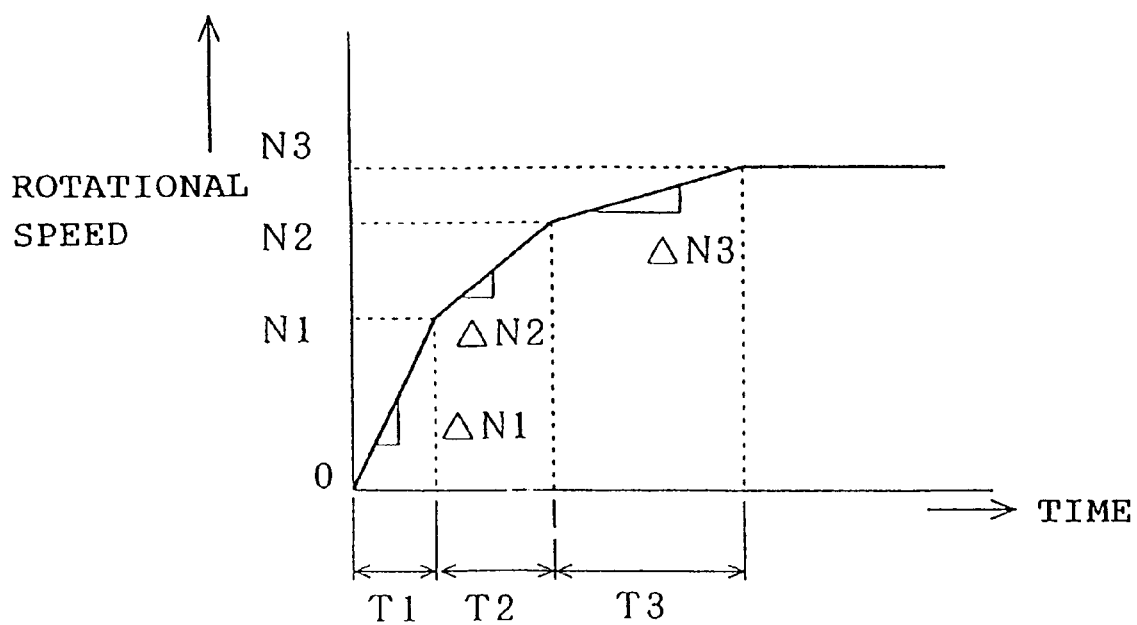
FIG. 8 is a graph similar to FIG. 3.

FIGS. 6 to 8 illustrate a second embodiment of the invention. In the first embodiment, the speed increase rate is changed when the target speed is reached. In the second embodiment, however, the motor 15 is controlled by the increase rate ΔN1 for a time T1 elapsing from the start of energization to the motor, as shown in FIG. 7. Thereafter, the motor 15 is controlled by the increase rate ΔN2 for a time T2. The motor 15 is further controlled by the increase rate ΔN3 for a time T3 in which the final target speed N3 is reached. The time T3 cannot take a fixed value since it is the time required for the motor speed to reach the final target speed.

In the second embodiment, the above-mentioned times T1 and T2 and the increase rates ΔN1, ΔN2 and ΔN3 are changed according to an amount of laundry detected before the start of the wash step, as shown in FIG. 7. Furthermore, the times T1 and T2 are changed in DEHYDRATIONs 1 to 3 when the amount of laundry is the same.

The microcomputer 23 operates at steps S1 to S7, S9 or S10 in the same manner as in the first embodiment, as shown in FIG. 6. That is, the microcomputer 23 operates in the same manner as in the first embodiment until the duty is changed according to the speed difference n. The microcomputer 23 advances to step S11 to input the measured time T from the timer and further to step S12 to determine whether T is below T1. When T is below T1, the microcomputer 23 determines in the affirmative (YES at step S12), maintaining the increase rate ΔNx at ΔN1. When T is at or above T1, the microcomputer 23 advances to step S13 to determine whether T is at or above T1 and below (T1+T2). When T is below (T1+T2), the microcomputer 23 determines in the affirmative (YES at step S13), advancing to step S14 to change the increase rate ΔNx from ΔN1 to ΔN2 and returning to step S3. When T is at or above (T1+T2), the microcomputer 23 determines in the negative (NO at step S13), advancing to step S15 to change the increase rate ΔNx from ΔN2 to ΔN3.

The microcomputer 23 then advances to step S16 to detect the speed of the motor 15 and further to step S17 to determine whether the detected speed N is at or above N3. When N is below N3, the microcomputer 23 determines in the negative (NO at step S17, returning to step S3. When the motor speed N is at or above N3, the microcomputer 23 determines in the affirmative (YES at step S17), advancing to step S18 to change the increase rate ΔNx from ΔN3 to 0. The microcomputer 23 further advances to step S19 to input the measured time T from the timer. When the measured time T falls within a previously set execution time of the dehydration step, the microcomputer 23 determines in the negative (NO at step S20), returning to step S3. When the measured time T becomes equal to or exceeds the execution time of the dehydration step, the microcomputer 23 determines in the affirmative (YES at step S20), finishing the dehydration step.

Figure 9:
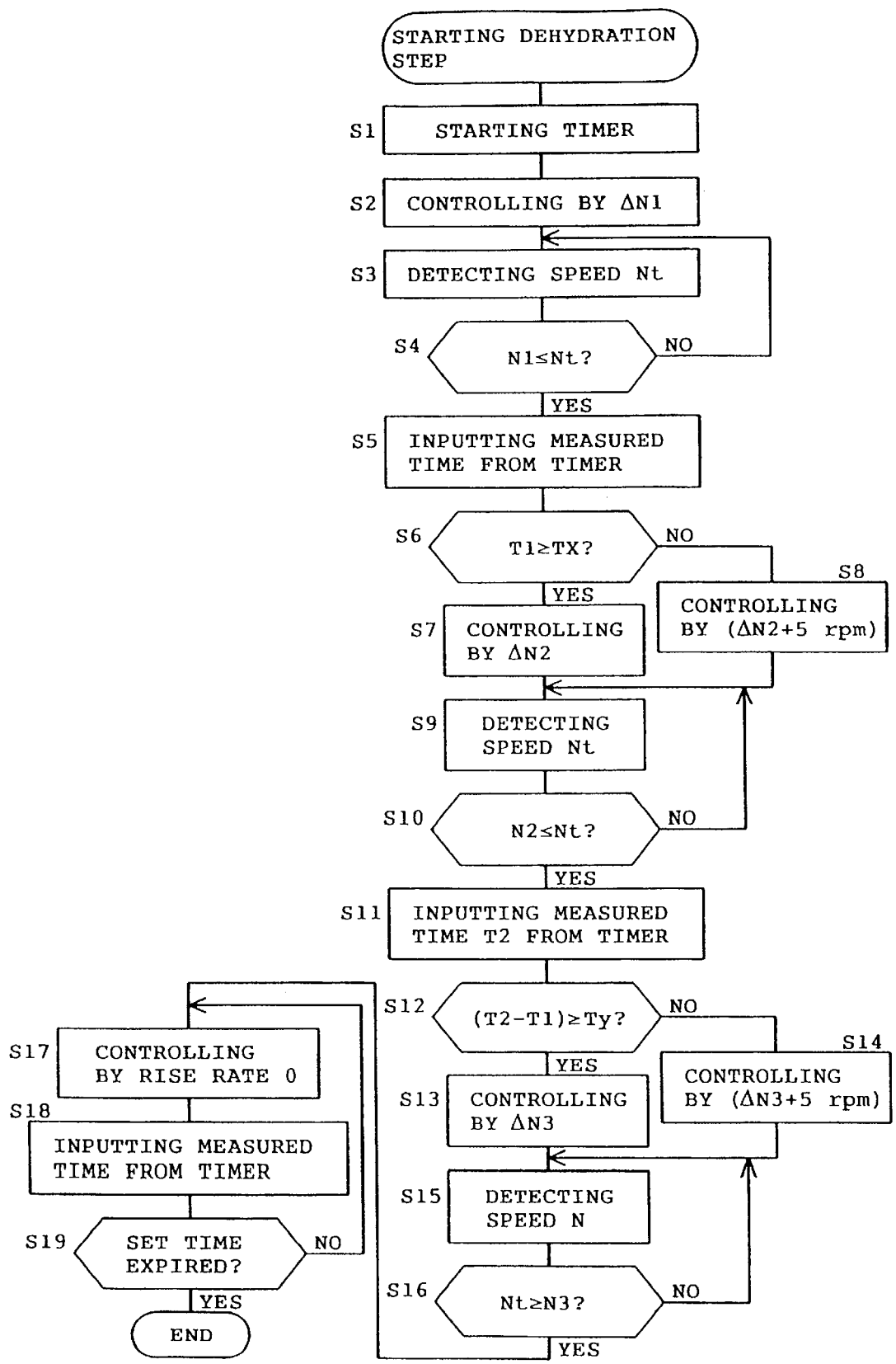
FIG. 9 is a flowchart similar to FIG. 1, showing a third embodiment in accordance with the present invention.
Figure 11:
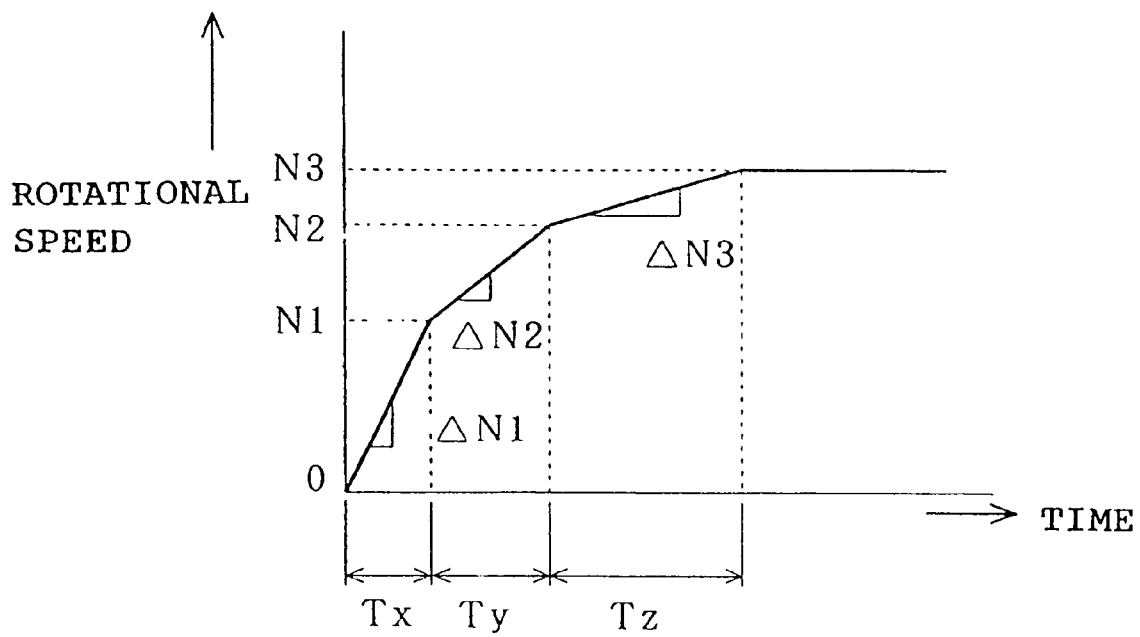
FIG. 11 is a view similar to FIG. 3.

FIGS. 9 to 11 illustrate a third embodiment of the invention. The third embodiment differs from the first embodiment in that the speed increase rate is changed according to times in which the target speeds N1 and N2 each of which includes a plurality of stages. More specifically, upon start of the dehydration step, the microcomputer 23 starts the timer at step S1, and sets the increase rate at ΔN1 and starts the motor 15 so that the speed thereof is increased at the set increase rate ΔN1 (step S2).

The microcomputer 23 then detects the speed Nt of the motor 15 at step S3 and determines at step S4 whether the detected speed Nt has reached the first target speed N1. When the detected speed Nt has not reached the first target speed N1, the microcomputer 23 repeats the steps S3 and S4. When the detected speed Nt has reached the first target speed N1 (YES at step S4), the microcomputer 23 inputs the measured time T1 from the timer (step S5) and determines whether the measured time T1 is at or above Tx (step S6). When T1 is at or above Tx, the microcomputer 23 determines in the affirmative (YES at step S6), advancing to step S7 to set the speed increase rate at ΔN2. The microcomputer 23 controls the motor 15 so that the speed thereof is increased at the set increase rate ΔN2.

When the time T1 is below Tx, the microcomputer 23 determines in the negative (NO at step S6), advancing to step S8 to set the increase rate so that the increase rate is 5 rpm higher than ΔN2. The microcomputer 23 controls the motor 15 so that the increase rate (ΔN2+5) is reached. The microcomputer 23 continues this control until the speed of the motor 15 reaches the second target speed N2 (repetition of steps S9 and S10). When the motor speed has reached the second target speed N2 (YES at step S10), the microcomputer 23 inputs the measured time T2 from the timer (step S11).

The microcomputer 23 then determines at step S12 whether the difference (T2−T1) between the currently input time T2 and the time T1 input at step S5 is at or above Ty. When the difference is at or above Ty (YES at step S12), the microcomputer 23 advances to step S13 to set the speed increase rate at ΔN3, so that the motor 15 is controlled so that the increase rate ΔN3 is reached. Furthermore, when the difference is below Ty (NO at step S12), the microcomputer 23 advances to step S14 to set the speed increase rate at a value 5 rpm higher than AN3 set at step S13. The motor 15 is controlled so that the increase rate (ΔN3+5) is reached. FIG. 8 shows concrete values of Tx and Ty. The values of N1, N2, N3, ΔN1, ΔN2 and ΔN3 are the same as those in FIG. 2 although these values are not shown in FIG. 8.

The microcomputer 23 continues the above-described control until the speed of the motor 15 reaches the third target speed N3 (repetition of steps S15 and S16). When the motor speed has reached the third target speed N3 (YES at step S16), the microcomputer 23 sets the speed increase rate at 0 and controls the motor 15 so that the speed N3 is maintained (step S17). The microcomputer 23 continues this control until the time measured by the timer becomes equal to the previously set execution time of the dehydration step (repetition of steps S18 and S19). When the set execution time has expired (YES at step S19), the microcomputer 23 deenergizes the motor 15 to thereby finish the dehydration step.

According to the third embodiment, the subsequent increase rate is increased when the times required for the motor to reach the target speeds N1 and N2 are short. Accordingly, the degree of unbalance of laundry is low when the target speed is reached at an early stage. Consequently, the subsequent increase rate is increased so that the final target speed is early reached, whereby the dehydrating efficiency can be improved.

Figure 12:
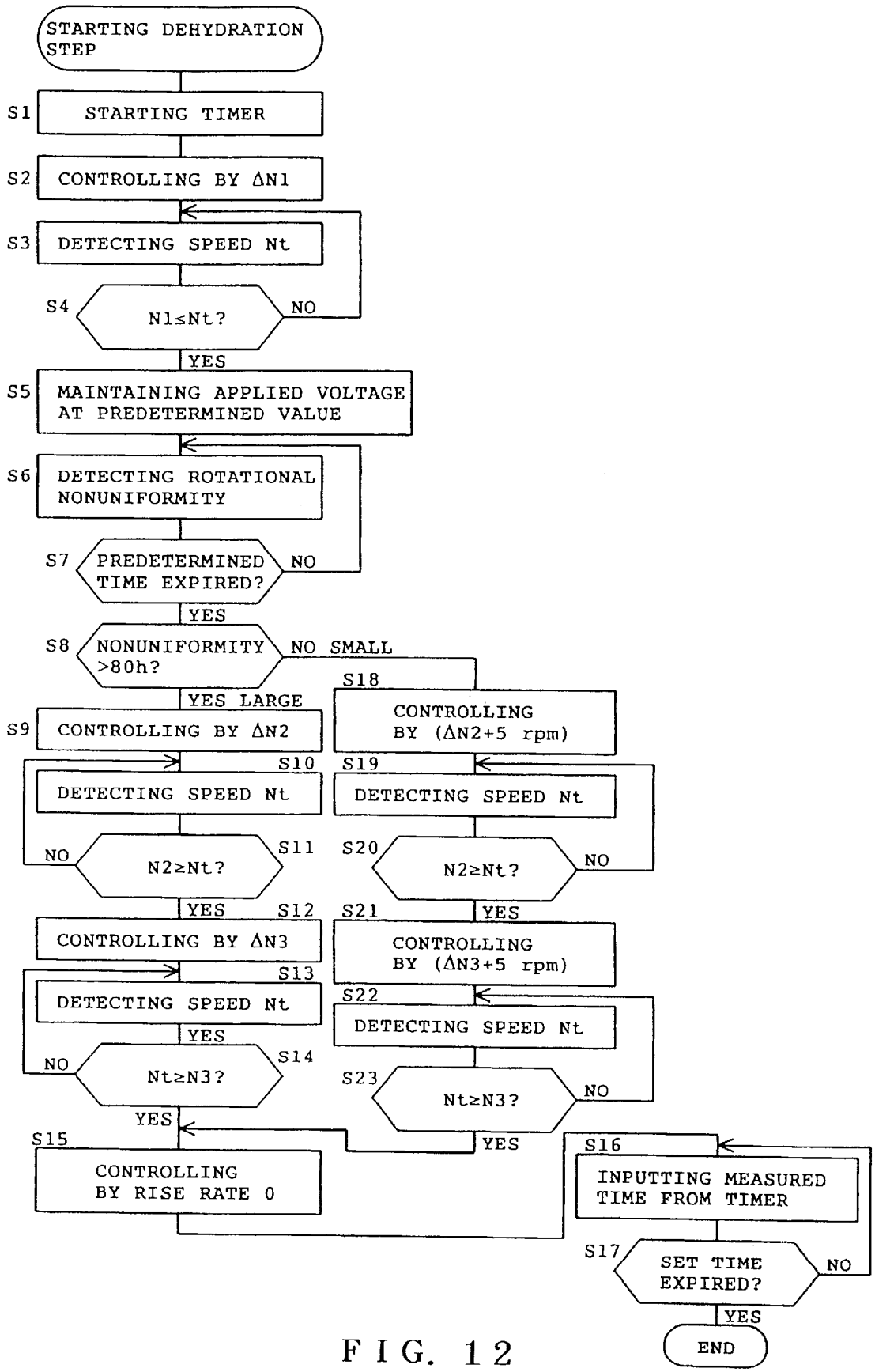
FIG. 12 is a flowchart similar to FIG. 1, showing a fourth embodiment in accordance with the present invention.

FIG. 12 illustrates a fourth embodiment of the invention. In the fourth embodiment, the effective value of the voltage applied to the motor is switched to that corresponding to the speed N1 when the motor 15 has reached the first target speed N1. Nonuniformity of the speed of the motor 15 is detected while the voltage of the switched value is being applied thereto. The subsequent speed increase rate is set according to the degree of nonuniformity of the motor speed. Steps S1 to S4 in FIG. 12 are the same as those in FIG. 9. When the speed of the motor 15 has reached N1 (YES at step S4), the microcomputer 23 controls the motor 15 so that the voltage applied thereto is maintained at a predetermined value at the speed N1 (step S5). With this condition being continued for a predetermined time, the microcomputer 23 detects the variations or nonuniformity in the speed of the motor 15 (repetition of steps S6 and S7). Upon expiration of the predetermined time, the microcomputer 23 determines in the affirmative (YES at step S7), advancing to step S8 to determine whether the rotational nonuniformity has exceeded 80h representative of a degree of rotational nonuniformity. The rotational nonuniformity is low when it is at or below 80h.

When the rotational nonuniformity is large, the microcomputer 23 determines in the affirmative (YES at step S8) and sets the speed increase rate at ΔN2 to control the motor 15 so that the increase rate ΔN2 is reached. The microcomputer 23 then detects the speed Nt of the motor 15 (step S10) and determines whether the speed Nt is at or above N2 (step S11), repeatedly. When Nt is at or above N2 (YES at step S11), the microcomputer 23 sets the increase rate at ΔN3 (step S12). The microcomputer 23 then detects the speed Nt of the motor 15 and determines whether the detected speed Nt is at or above N3 (steps S13 and S14), repeatedly. When Nt is at or above N3 (YES at step S14), the microcomputer 23 sets the speed increase rate at 0 (step S15).

The microcomputer 23 determines in the negative (NO at step S8) when the rotational nonuniformity is low. The microcomputer 23 then advances to step S18 to set the speed increase rate at (ΔN2+5), controlling the motor 15 so that the speed increase rate (ΔN2+5) is reached. The microcomputer 23 then detects the speed Nt of the motor 15 and determines whether the detected speed Nt is at or above N2 (steps S19 and S20), repeatedly. When Nt is at or above N2 (YES at step S20), the microcomputer 23 sets the speed increase rate at (ΔN3+5) at step S21. The microcomputer 23 then detects the speed Nt of the motor 15 and determines whether the detected speed Nt is at or above N3 (steps S22 and S23), repeatedly. When Nt is at or above N3 (YES at step S23), the microcomputer 23 sets the speed increase rate at 0 (step S15). Thereafter, the microcomputer 23 repeatedly executes the steps S16 and S17 to determine whether the time measured by the timer has reached the execution time of the dehydration step. When the set time of the dehydration step has expired (YES at step S17), the microcomputer 23 deenergizes the motor 15 to finish the dehydration step.

According to the fourth embodiment, the nonuniformity of the rotational speed of the motor 15 is detected. The speed increase rate is set according to the detected nonuniformity. The degree of unbalance of laundry is high and accordingly, the speed increase rate of the tub is low when the speed nonuniformity is large. In such a case, the rotational speed of the motor 15 is gradually increased so that the vibration of the rotatable tub 4 can be reduced.

Figure 14:
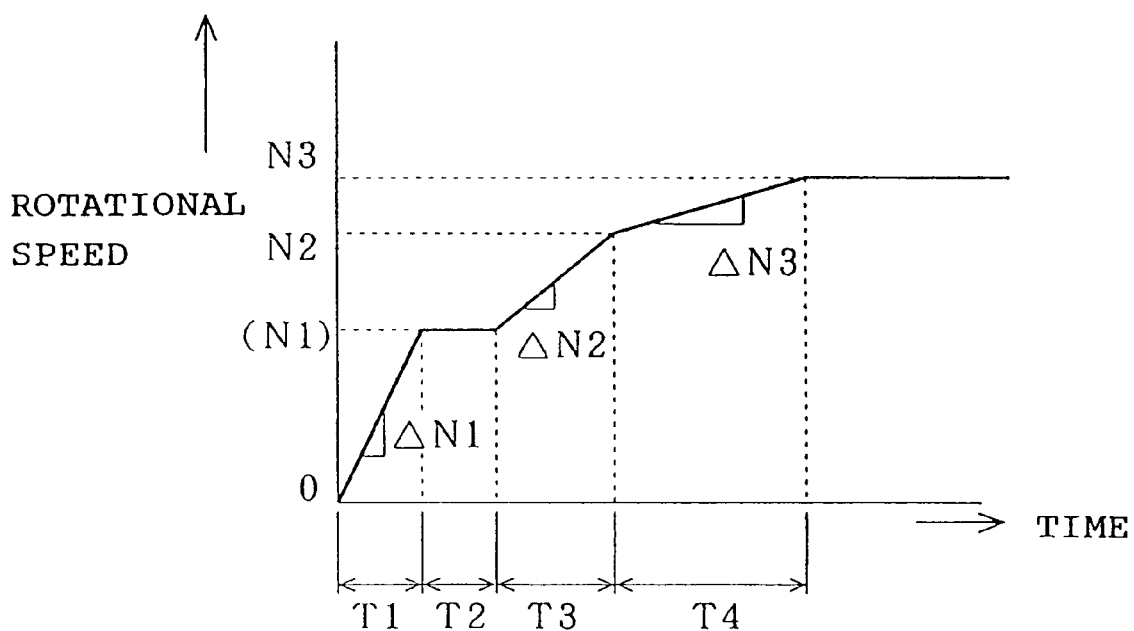
FIG. 14 is a graph similar to FIG. 3, showing the speed increase characteristics of the motor in the dehydration step in the fifth embodiment in accordance with the invention.

FIGS. 13 and 14 illustrate a fifth embodiment of the invention. In the fifth embodiment, the speed nonuniformity is detected and the speed increase rate of the motor 15 is controlled on the basis of the detected speed nonuniformity in the same manner as in the foregoing fifth embodiment. The fifth embodiment differs from the fourth embodiment in that the motor 15 is controlled on the basis of the speed increase rate ΔN1 at an initial stage of energization thereto and this control manner is continued for the time T1. Upon expiration of the time T1, the voltage applied to the motor 15 is changed, for example, is caused to drop so that the speed increase is stopped at the speed N1 at that time. The rotational nonuniformity of the motor 15 is detected while the change voltage value is being maintained for a predetermined time T2. The time T3 for which the motor 15 is controlled on the basis of the speed increase rate ΔN2 is changed according to the results of the detection of speed nonuniformity. The control on the basis of the increase rate ΔN3 is executed until the motor speed reaches the final target speed N3. The same effect can be achieved in the fifth embodiment as in the fourth embodiment.

Although the brushless motor 15 is provided in the washing machine in the foregoing embodiments, an induction motor controlled by an inverter device may be provided, instead. In the first embodiment, the increase rates ΔN1 and ΔN2 may be changed to ΔN2 and ΔN3 respectively after the control on the basis of ΔN1 and ΔN2 is continued for a predetermined time. Furthermore, the above-described increase rate changing control may be applied to a case where the agitator 5 is rotated in the normal and reverse directions in the wash and rinse steps.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A washing machine including an electric motor for driving an agitator and a dehydration tub, comprising:
   an inverter main circuit including a plurality of switching elements connected to windings of a plurality of phases of the motor respectively; and
   control means for driving the switching elements of the inverter main circuit, the control means including means for executing a speed increase rate changing control in which a rotational speed of the motor is changed among a plurality of increase rates during drive of the motor in at least one of operation steps between a wash step and a final dehydration step before the motor reaches a final target speed.

2. A washing machine according to claim 1, wherein the control means executes the increase rate changing control in a dehydration step.

3. A washing machine according to claim 2, wherein a time when the increase rate of the motor speed is changed by the increase rate changing control corresponds to a time when the motor reaches at least one target speed provided in the midst of a speed range leading to the final target speed.

4. A washing machine according to claim 3, wherein the control means further includes laundry amount detecting means for detecting an amount of laundry and the increase rate changing time is changed according to a result of detection by the laundry amount detecting means in the increase rate changing control.

5. A washing machine according to claim 3, wherein either the increase rate changing time or the increase rate to be changed differs between at least one of a dehydration operation of the wash step, a dehydration operation of a rinse step, and the final dehydration operation and the other dehydration operations.

6. A washing machine according to claim 3, which further comprises rotational nonuniformity detecting means for detecting rotational nonuniformity of the motor and wherein the increase rate changing time is changed according to a result of detection by the rotational nonuniformity detecting means.

7. A washing machine according to claim 2, wherein a time when the increase rate of the motor speed is changed by the increase rate changing control corresponds to a time when a predetermined period of time elapses.

8. A washing machine according to claim 7, wherein the control means further includes laundry amount detecting means for detecting an amount of laundry and the increase rate changing time is changed according to a result of detection by the laundry amount detecting means in the increase rate changing control.

9. A washing machine according to claim 7, wherein either the increase rate changing time or the increase rate to be changed differs between at least one of a dehydration operation of the wash step, a dehydration operation of a rinse step, and the final dehydration operation and the other dehydration operations.

10. A washing machine according to claim 7, which further comprises timing means for timing reach of an intermediate target rotational speed of the motor and wherein the subsequent increase rate of the motor speed is changed according to a time obtained by the timing means.

11. A washing machine according to claim 2, which further comprises rotational nonuniformity detecting means for detecting rotational nonuniformity of the motor and wherein the increase rate changing time is changed according to a result of detection by the rotational nonuniformity detecting means.

12. A washing machine according to claim 1, wherein a time when the increase rate of the motor speed is changed by the increase rate changing control corresponds to a time when the motor reaches at least one target speed provided in the midst of a speed range leading to the final target speed.

13. A washing machine according to claim 12, wherein the control means further includes laundry amount detecting means for detecting an amount of laundry and the increase rate changing time is changed according to a result of detection by the laundry amount detecting means in the increase rate changing control.

14. A washing machine according to claim 12, wherein either the increase rate changing time or the increase rate to be changed differs between at least one of a dehydration operation of the wash step, a dehydration operation of a rinse step, and the final dehydration operation and the other dehydration operations.

15. A washing machine according to claim 12, which further comprises rotational nonuniformity detecting means for detecting rotational nonuniformity of the motor and wherein the increase rate changing time is changed according to a result of detection by the rotational nonuniformity detecting means.

16. A washing machine according to claim 1, wherein a time when the increase rate of the motor speed is changed by the increase rate changing control corresponds to a time when a predetermined period of time elapses.

17. A washing machine according to claim 16, wherein the control means further includes laundry amount detecting means for detecting an amount of laundry and the increase rate changing time is changed according to a result of detection by the laundry amount detecting means in the increase rate changing control.

18. A washing machine according to claim 16, wherein either the increase rate changing time or the increase rate to be changed differs between at least one of a dehydration operation of the wash step, a dehydration operation of a rinse step, and the final dehydration operation and the other dehydration operations.

19. A washing machine according to claim 16, which further comprises timing means for timing reach of an intermediate target rotational speed of the motor and wherein the subsequent increase rate of the motor speed is changed according to a time obtained by the timing means.

* * * * *